(12) United States Patent
Centonza et al.

(10) Patent No.: US 9,900,817 B2
(45) Date of Patent: Feb. 20, 2018

(54) SYSTEM AND METHOD FOR IDENTIFYING A HANDOVER TARGET CELL DURING CELL RECONFIGURATION PERIODS

(71) Applicant: Telefonaktiebolaget L M Ericsson (publ), Stockholm (SE)

(72) Inventors: Angelo Centonza, Winchester (GB); Markus Drevö, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 14/436,571

(22) PCT Filed: Mar. 20, 2015

(86) PCT No.: PCT/SE2015/050328
§ 371 (c)(1),
(2) Date: Apr. 17, 2015

(87) PCT Pub. No.: WO2015/147726
PCT Pub. Date: Oct. 1, 2015

(65) Prior Publication Data
US 2016/0198377 A1    Jul. 7, 2016

Related U.S. Application Data

(60) Provisional application No. 61/971,319, filed on Mar. 27, 2014.

(51) Int. Cl.
*H04W 36/14*    (2009.01)
*H04W 36/00*    (2009.01)

(52) U.S. Cl.
CPC ....... *H04W 36/14* (2013.01); *H04W 36/0061* (2013.01); *H04W 36/0083* (2013.01)

(58) Field of Classification Search
CPC ......... H04W 36/0061; H04W 36/0083; H04W 36/14
See application file for complete search history.

(56) References Cited

PUBLICATIONS

3GPP TSG-RAN3 Meeting #86 R3-142910 San Francisco, USA, Nov. 17-21, 2014; R3-142910; Title: On the need of cell configuration change notification.*

(Continued)

*Primary Examiner* — Charles C Jiang
*Assistant Examiner* — M Mostazir Rahman
(74) *Attorney, Agent, or Firm* — Baker Botts LLP

(57) ABSTRACT

In one example embodiment, a method performed by a target network node is provided for replacing an inactive cell with an active cell in response to a handover request message following one or more reconfigurations. An inactive cell may be replaced with an active cell that reuses a first physical cell identity associated with the inactive cell. A mapping between the inactive cell and the active cell that is replacing the inactive cell may be stored. A handover request message may be received from a source network node. The handover request message may identify the first physical cell identity and one or more cell identifiers that points to the inactive cell. It may be determined that the first physical cell identity and the one or more cell identifiers identified in the handover request message point to the inactive cell. Based on the mapping between the inactive cell and the active cell, the active cell may be identified as reusing the first physical identity. In response to a request from a wireless device for handover execution to the inactive cell, a message to the wireless device may be transmitted to acknowledge completed handover preparation toward the active cell.

22 Claims, 12 Drawing Sheets

(56) References Cited

PUBLICATIONS

PCT Written Opinion of the International Preliminary Examining Authority for International application No. PCT/SE2015/050328—dated Feb. 19, 2016.
PCT Notification of Transmittal of the International Search Report and the Written Opinion of the International Searching Authority, or the Declaration for International application No. PCT/SE2015/050328, dated Jun. 15, 2015.
3GPP TSG RAN WG3 Meeting #79bis; Chicago, USA; Source: CATT; Title: Impact of AAS on network performance (R3-130472), Apr. 15-19, 2013.
3GPP TSG-RAN WG3 Meeting #82; San Francisco, USA; Source: LG Electronics; Title: Solutions for AAS handover failures (R3-132214), Nov. 11-15, 2013.
3GPP TS 25.413 V12.1.0; Technical Specification; 3rd Generation Partnership project; Technical Specification Group Radio Access Network; UTRAN Iu interface Radio Access Network Application Part (RANAP) signalling (Release 12), Mar. 2014.
3GPP TSG RAN WG3 Meeting #80; Fukuoka, Japan; Source: CATT; Title: Solutions for failures incurred by AAS (R3-130827), May 20-24, 2013.
3GPP TS 36.508 V12.1.0; Technical Specification; 3rd Generation Partnership Project; Technical Specification Group Radio Access Network; Evolved Universal Terrestrial Radio Access (E-UTRA) and Evolved Packet Core (EPC); Common test environments for User Equipment (UE) conformance testing (Release 12), Mar. 2014.
3GPP TSG-RAN3 Meeting #86; San Francisco, USA; Source: Ericsson; Title: On the need of cell configuration change notification (R3-142910), Nov. 17-21, 2014.
3GPP TS 36.423 V12.0.0; 3rd Generation Partnership Project; Technical Specification Group Radio Access Network; Evolved Universal Terrestrial Radio Access Network (E-UTRAN); X2 application protocol (X2AP) (Release 12), Dec. 2013.
3GPP TS 36.331 V12.0.0; 3rd Generation Partnership Project; Technical Specification Group Radio Access Network; Evolved Universal Terrestrial Radio Access (E-UTRA); Radio Resource Control (RRC); Protocol specification (Release 12), Dec. 2013.
3GPP TS 36.300 V12.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Dec. 2013.
3GPP TS 23.401 V12.0.0; 3rd Generation Partnership Project; Technical Specification Group Services and System Aspects; General Packet Radio Service (GPRS) enhancements for Evolved Universal Terrestrial Radio Access Network (E-UTRAN) access (Release 12), Mar. 2013.
3GPP TS 25.331 V12.0.0; 3rd Generation Partnership Project; Technical Specification Group Radio Access Network; Radio Resource Control (RRC); Protocol specification (Release 12) due to size, this reference has been split into 10 separate parts, Dec. 2013.
3GPP TS 25.413 V12.1.0; 3rd Generation Partnership Project; Technical Specification Group Radio Access Network; UTRAN Iu interface Radio Access Network Application Part (RANAP) signalling (Release 12), Mar. 2014.
PCT International Preliminary Report on Patentability for International application No. PCT/SE2015/050328—dated Jun. 13, 2016.

* cited by examiner

SYSTEM AND METHOD FOR IDENTIFYING A HANDOVER TARGET CELL DURING CELL RECONFIGURATION PERIODS

PRIORITY

This nonprovisional application is a U.S. National Stage Filing under 35 U.S.C. § 371 of International Patent Application Serial No. PCT/SE2015/050328, filed Mar. 20, 2015, and entitled "System and Method for Identifying a Handover Target Cell During Cell Reconfiguration Periods" which claims priority to U.S. Provisional Patent Application No. 61/971,319 filed Mar. 27, 2014, both of which are hereby incorporated by reference in their entirety.

TECHNICAL FIELD

Particular embodiments relate generally to wireless communications and more particularly to a system and method for identifying a handover target cell during cell reconfiguration periods.

BACKGROUND

Handover, which is the transfer of a communications session from cell to another, is an important aspect of any mobile communication system attempting to provide continuous service to wireless devices moving about a network. The transfer of the connection from one cell to another may depend on factors such as signal strength, load conditions, service requirements, or a combination thereof. Efficient and effective handovers are those that are effected with a minimum number of unnecessary handovers, minimum number of handover failures, minimum handover delay, etc., which may affect not only the Quality of Service, QoS, of the user equipment, UE, but also the overall mobile network capacity and performance.

Handover failure may occur when a wireless device is handed over to a cell that is not active. One such scenario when handover failure might occur includes when a cell identifier is wrong. For example, a UE may report only a physical cell identity when reporting an event that triggers mobility towards a target node. Such physical identity can be the physical cell identifier, PCI, for Evolved Universal Mobile Telecommunications System Terrestrial Radio Access, E-UTRAN; the physical scrambling codes, PSC, for Universal Mobile Telecommunications System Terrestrial Radio Access, UTRAN; and/or other suitable physical identity for another system. In certain scenarios, this physical identity may be associated to a neighbor cell relationship between the source cell and a target cell. Thus, related cells may use the same physical layer identity but have cell configuration parameters (e.g. E-CGI) that are different from the cell identified and reported by the UE. As a result, a mobility procedure may be started towards a cell that cannot be identified correctly by the parameters contained in the handover preparation messages sent by the source serving node. Furthermore, the optimal mobility settings from the source radio access technology to E-UTRAN is typically not the same when the cell configuration in the eNodeB is changed. As a result, the source radio access technology does not know how to perform mobile handover to the target eNodeB with sufficient capacity and/or energy efficiency.

SUMMARY

Some embodiments may provide methods for identifying a handover target cell during cell configuration periods. In one example embodiment, a method performed by a target network node is provided for replacing an inactive cell with an active cell in response to a handover request message following one or more reconfigurations. An inactive cell may be replaced with an active cell that reuses a first physical cell identity associated with the inactive cell. A mapping between the inactive cell and the active cell that is replacing the inactive cell may be stored. A handover request message may be received from a source network node. The handover request message may identify the first physical cell identity and one or more cell identifiers that points to the inactive cell. It may be determined that the first physical cell identity and the one or more cell identifiers identified in the handover request message point to the inactive cell. Based on the mapping between the inactive cell and the active cell, the active cell may be identified as reusing the first physical identity. In response to a request from a wireless device for handover execution to the inactive cell, a message to the wireless device may be transmitted to acknowledge completed handover preparation toward the active cell.

In another example embodiment, a target network node for replacing an inactive cell with an active cell in response to a handover request message following one or more cell reconfigurations includes a memory storing instructions and one or more processors in communication with the memory. The one or more processors may operate to execute the instructions to cause the one or more processors to replace an inactive cell with an active cell that reuses a first physical cell identity associated with the inactive cell. A mapping between the inactive cell and the active cell that is replacing the inactive cell may be stored. A handover request message from a source network node may be received. The handover request message may identify the first physical cell identity and one or more cell identifiers associated with the inactive cell. It may be determined that the first physical cell identity and the one or more cell identifiers identified in the handover request message point to the inactive cell. Based on the mapping between the inactive cell and the active cell, the active cell that reuses the first physical cell identity may be identified. In response to a request from a wireless device for handover execution to the inactive cell, a message may be transmitted to the wireless device that acknowledges completed handover preparation toward the active cell.

Other implementations may include a wireless communication device and/or access node configured to implement the described method, or a wireless communication system in which a wireless communication device and/or access node implement the described method. Some embodiments of the disclosure may provide one or more technical advantages.

For example, in certain embodiments, means for handover towards a cell that is not active may be provided. The handover success may be due to the capability of the network (i.e., target base station, OAM system or any other equivalent entity) to maintain a mapping of old cell configuration and current cell configuration and to be able to prepare for handover cells that are active and that replace in part or in full the inactive cell towards which the handover is triggered. Another technical advantage may be that legacy source radio access systems may not be subject to any changes due to the introduction of dynamic cell configuration changes at target radio access systems.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Particular embodiments are described in FIGS. 1-10 of the drawings, like numerals being used for like and corresponding parts of the various drawings.

Figure 1:
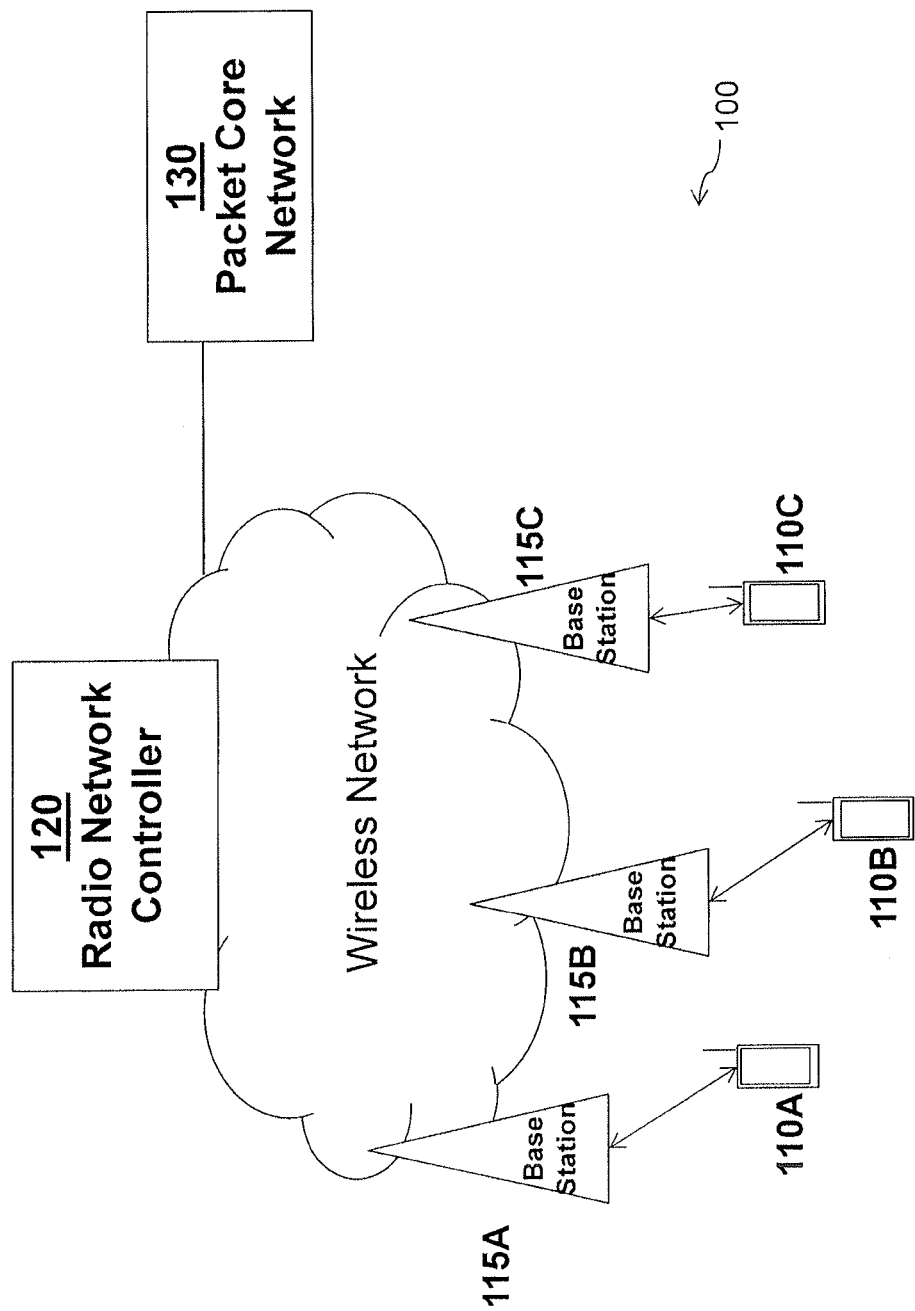
FIG. 1 is a block diagram illustrating an exemplary network, according to certain embodiments.

A radio network controller may facilitate a communication session for a wireless device in handover with an active set of cells. FIG. 1 is a block diagram illustrating embodiments of a radio network 100 that includes one or more wireless devices 110A-C, radio network nodes 115A-C, radio network controller 120, and core network nodes 130. Wireless devices 110A-C may communicate with radio network nodes 115A-C over a wireless interface. For example, wireless device 110A may transmit wireless signals to radio network node 115A and/or receive wireless signals from radio network node 115A. The wireless signals may contain voice traffic, data traffic, control signals, and/or any other suitable information.

Radio network nodes 115A-C may interface with radio network controller 120. The radio network nodes 115A-C and the radio network controller 120 are comprised in a radio access network, RAN. Radio network controller 120 may control radio network node 115A-C and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network, PSTN; a public or private data network; a local area network, LAN; a metropolitan area network, MAN; a wide area network, WAN; a local, regional, or global communication or computer network such as the Internet; a wireline or wireless network; an enterprise intranet; or any other suitable communication link, including combinations thereof.

In some radio access technologies, RATs, such as in LTE networks, the functions of the radio network controller 120 are comprised in the radio network nodes 115A-C. In some embodiments, core network node 130 may manage the establishment of communication sessions and various other functionality for wireless devices 110A-C. For example, wireless devices 110A-C, radio network nodes 115A-C, and core network node 130 may use any suitable radio access technology, such as long term evolution, LTE; LTE-Advanced; Universal Mode Telecommunications System, UMTS; High Speed Packet Access, HSPA; Global System for Mobile Communications, GSM; code division multiple access 2000, CDMA2000; Worldwide Interoperability for Microwave Access, WiMax; WiFi; another suitable radio access technology; or any suitable combination of one or more of these or other radio access technologies. In particular embodiments, a wireless device 110A-C may exchange certain signals with core network node 130 using the non-access stratum layer. In non-access stratum signaling, signals between wireless device 110A-C and core network node 130 may be transparently passed through the radio access network.

As described herein, embodiments of network 100 may include one or more wireless devices 110A-C, and one or more different types of network nodes capable of communicating (directly or indirectly) with wireless devices 110A-C. Examples of the network nodes include network nodes 115A-C, radio network controller 120, and core network nodes 130. However, network 100 may include any additional elements suitable to support communication between wireless devices 110A-C or between a wireless device 110A-C and another communication device (such as a landline telephone). Each wireless device 110A-C, radio network node 115A-C, radio network controller 120, and core network node 130 may include any suitable combination of hardware and/or software. Examples of particular embodiments of wireless device 110A-C, radio network nodes 115A-B, and network nodes (such as radio network controller 120 or core network node 130) are described with respect to FIGS. 8, 9, and 10, respectively.

In certain embodiments, a wireless device 110A-C may be handed over from a cell associated with a network node 115A-C to a cell associated with another network node 115A-C. Handover provides service continuity where, for example, a wireless device 110A-C moves from one cell to another. Additionally, handover may be provided based on signal strength between wireless device 110A-C and the network nodes 115A-C, load conditions of the network nodes 115A-C, service requirements, or other factors. If performed efficiently, handover is completed with a minimum number of handovers, a minimum number of handover failures, and a minimum handover delay. Excessive handovers, handover failures, and handover delay can affect Quality of Service, QoS, of the end user of wireless device.

Handover failure may occur when network node 115A-C attempts to handover a communication session to an inactive cell after a reconfiguration procedure. Current standardization discussions concerning Active Antenna Systems, AAS, and Cell Reconfiguration have considered various example scenarios in which a network node 115A-C may reconfigure its cells. Reconfiguration may be performed for the purpose of capacity improvements and energy saving, in certain embodiments. As described herein, network nodes 115A-B may be able to reconfigure its cells while preserving the use of reference signals identifiers such as Physical Cell Identifications, PCI, for Evolved Universal Terrestrial Radio Access Network, E-UTRAN, or Physical Scrambling Codes, PSC, for Universal Terrestrial Radio Access Network, UTRAN.

In certain embodiments, a network node 115A-C may have existing neighboring cell relationships with cells associated with reported PCIs. Stated differently, network node 115A-C may store parameters associated with neighboring cell identifiers such as Evolved Cell Global Identity, E-CGI; Tracking Area Identity, TAI; evolved NodeB identifier, eNodeB ID; and public land mobile network, PLMN ID. During a reconfiguration process, a cell with a given Cell Identity, such as an E-CGI in LTE, can be replaced by two or more cells with different Cell Identities. However, one of the new cells may maintain the Cell Identity of the original cell. For example, a new active cell may maintain the PCI of the original cell. In another scenario, many cells with different Cell Identifiers and different PCIs may be aggregated into one new cell. In this scenario, the new cell may have a new Cell Identity, e.g. E-CGI, not used by any previous cell, but may reuse one of the PCIs used by a previous cell.

In the scenario described above, user equipment such as wireless device 110A-C may be served by one of network nodes 115A-C at a given time. A neighboring network node 115A-C or another base station may undergo a cell configuration change. For example, wireless device 110A may be served by network node 115A, which neighbors network node 115B. Where network node 115B undergoes a cell configuration change, wireless device 110A may measure the frequencies on which the newly configured cells are deployed and report to serving network node 115A a list of detected PCIs associated to the PCIs reused by one of the newly created cells. However, because the PCIs were previously used by a different cell, this neighbor cell relationship might point at cell parameters that are associated to the old and inactive cell rather than the new active cell. For example, the cell relationship may associate the PCI of a newly created cell reported by the UE with the E-CGI, TAI, eNB ID and PLMN ID of a cell that has been deactivated or moved to dormant state.

An LTE example where the serving radio access technology, RAT, is UTRAN and the wireless device-measured RAT is E-UTRAN is as follows:

Cell A has E-CGI A and PCI A.
Cell A is split by an eNB into two cells: Cell B with E-CGI B and PCI A+ Cell C with E-CGI C and PCI C.
A wireless device 110A is served by network nodes 115A and radio network controller 120 in UTRAN measures PCI A in E-UTRA and reports this PCI to the radio network controller 120.
Serving radio network controller 120 has a neighbor cell relationship with Cell A (E-CGI A; PCI A) and assumes that the cell corresponding to PCI A measured by wireless device 110A is Cell A.
Serving radio network controller 120 initiates a handover procedure towards a cell with PCI A and E-CGI A. However, in a particular embodiment, this cell is not active anymore.

As outlined in the example above, if wireless device 110A-C is handed over to a cell that is not active a handover failure may occur. In particular, the failure would be due to a number of reasons such as:

The Handover Required/Request message may contain parameters that do not match existing active cells. For example, the Handover Required/Request message may contain a wrong Cell Identifier, e.g. E-CGI.

The Handover Required/Request message may not be routed to the right target node 115A-C. This may happen because the neighbor relation in the source network node 115A-C has nodes identifiers that do not correspond to the newly active target cells detected. For example, the target eNodeB ID associated to a detected PCI in the source radio network controller 120 does not correspond to the network node 115A-C serving the newly created cell using the detected PCI.

Systems and methods described herein, however, may address the handover failure issues that may be caused by the problems stated above.

Figure 2:
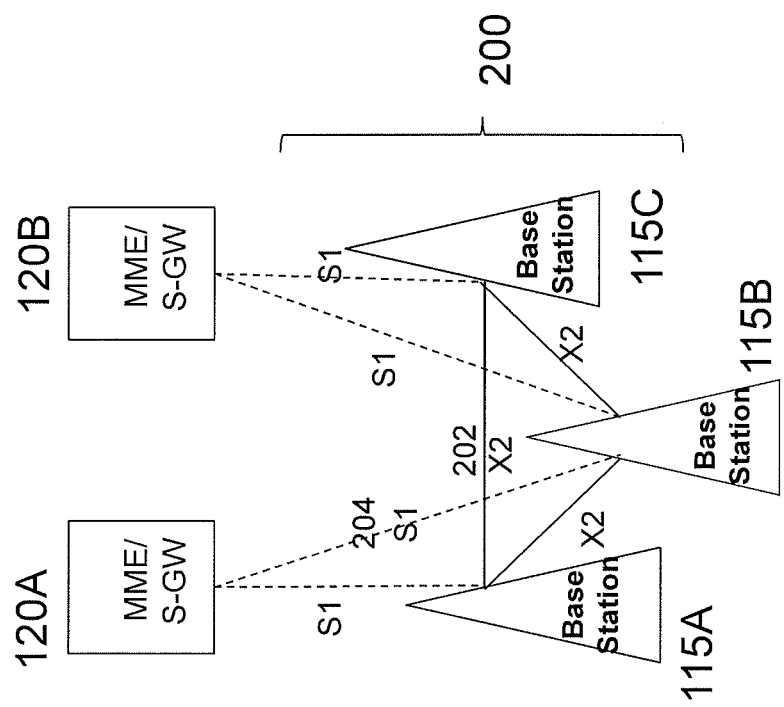
FIG. 2 is a block diagram illustrating an exemplary Long-term Evolution, LTE network, according to certain embodiments.
Figure 3A:
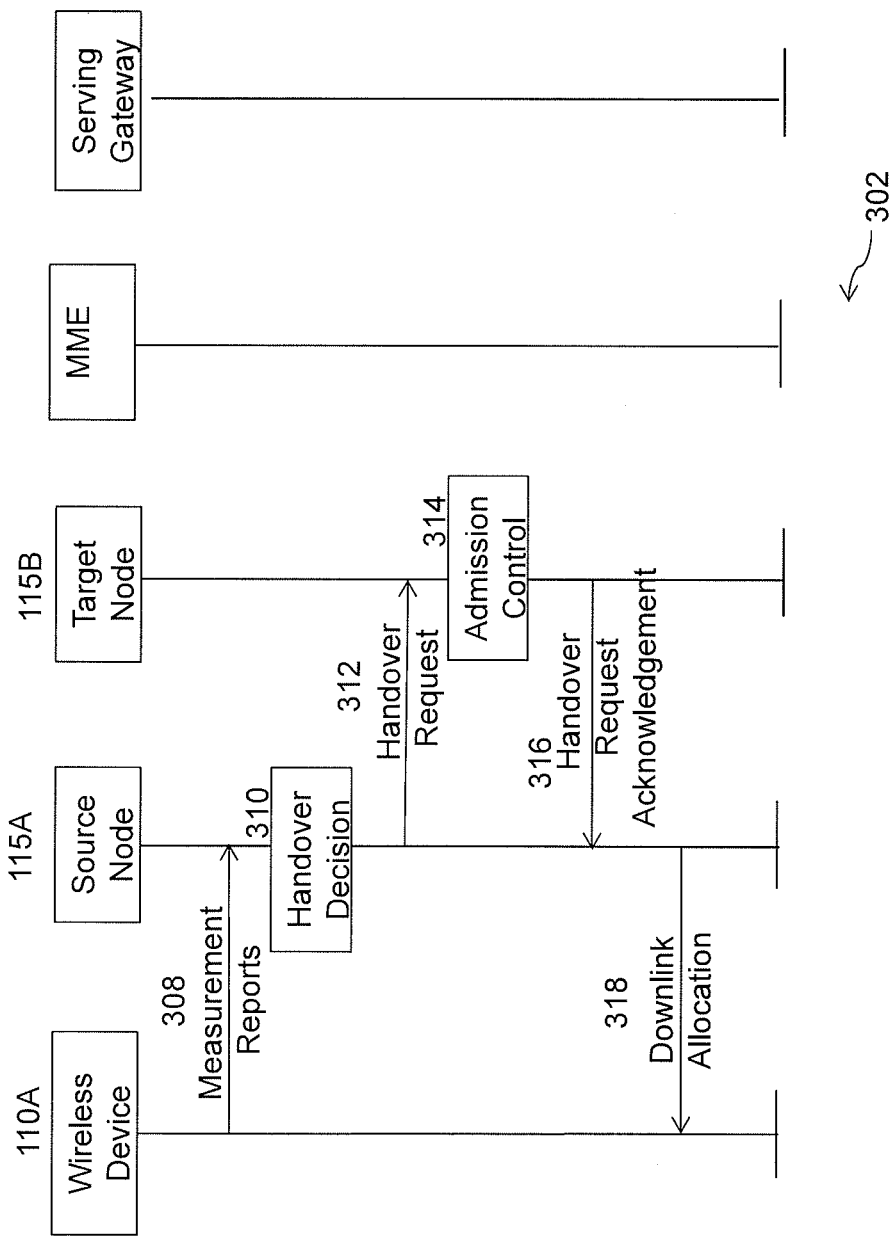
FIGS. 3A-3C are combined flowcharts and signalling diagrams illustrating the various stages of an exemplary method for performing handover in an LTE network, according to certain embodiments.
Figure 3B:
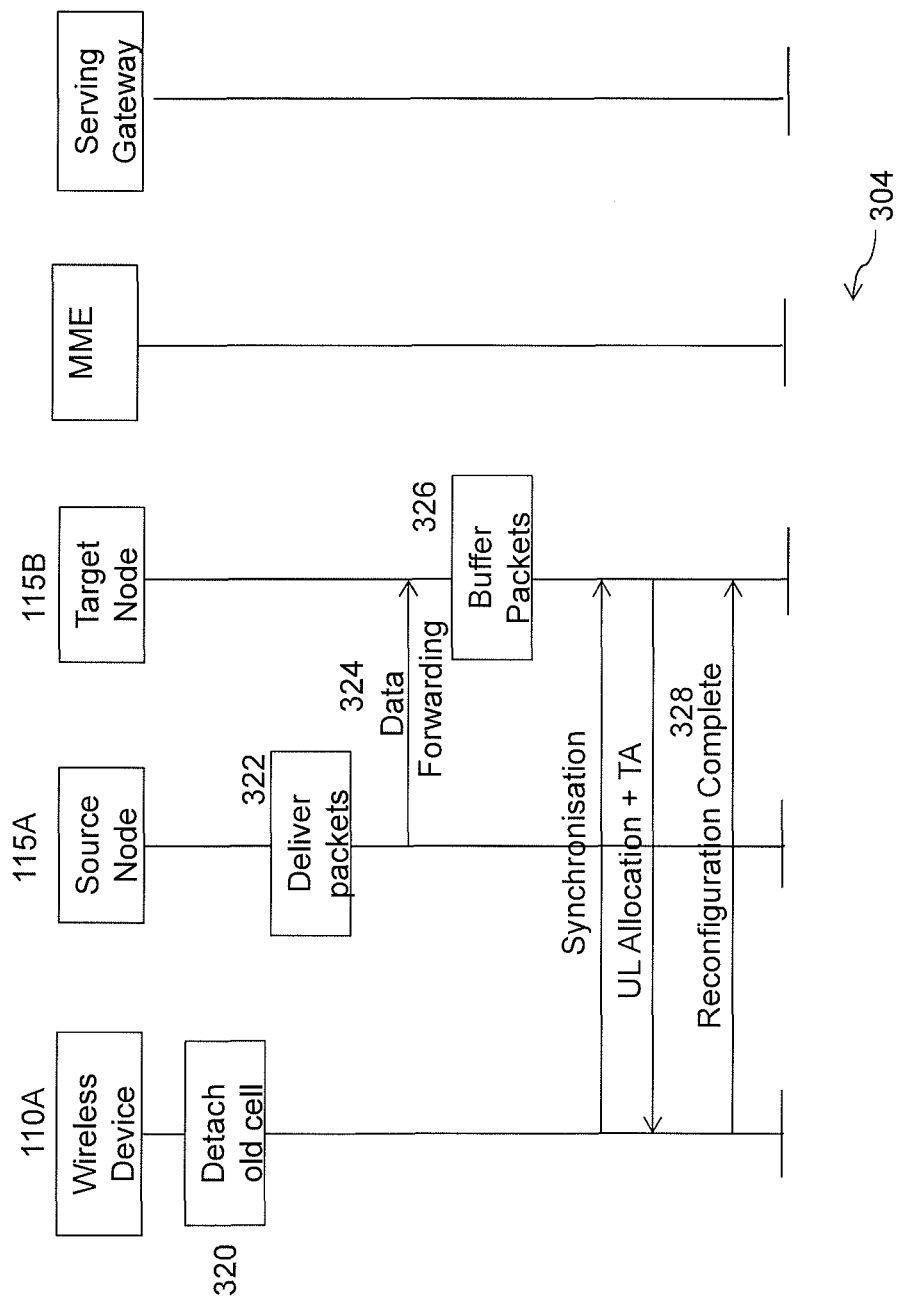
Figure 3C:
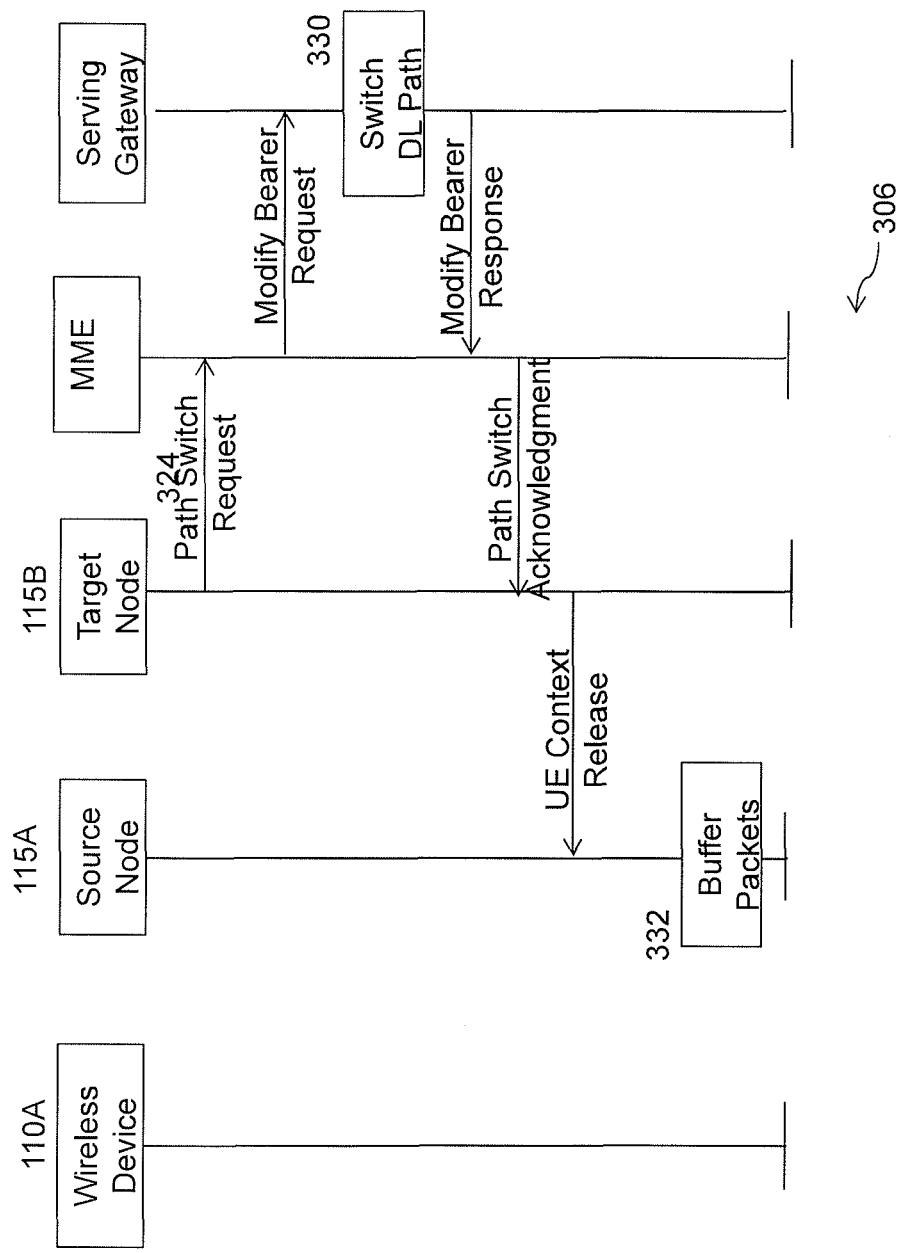

FIG. 2 is a block diagram illustrating an exemplary embodiment of an LTE architecture for reducing handover failure issues, according to certain embodiments. As depicted, RAN 200, which is called E-UTRAN 200 in LTE networks, is made up of network nodes 115A-C such as eNB or eNodeB nodes, which are connected to each other via the X2 interface 202. As mentioned above, the functions of the radio network controller 120 shown in FIG. 1 are comprised in the radio network nodes 115A-C in E-UTRAN. Network nodes 115A-C communicate with core network nodes such as Mobility Management Entity/Serving Gateway nodes, MME/S-GW, 130A-B via an S1 interface 204. The S1 204 and the X2 202 interfaces can be divided into control plane (dashed lines) and user plane (solid lines) parts, respectively. An example method for identifying a target cell after a cell reconfiguration procedure in an LTE network such as E-UTRAN 200 is illustrated in FIGS. 3A-C. However, E-UTRAN 200 is provided as just one example of a network in which the below described handover techniques may be employed. The methods described herein may be applied to other types of networks and standards.

According to the exemplary method depicted in FIGS. 3A-C, the handover procedure may be subdivided into three stages, including handover preparation 302, handover execution 304, and handover completion 306, which are illustrated in FIGS. 3A, 3B, and 3C. During the preparation stage 302 of FIG. 3A, a source network node receives measurement reports at a step 308.

The measurement report may be periodic or even triggered. In a particular embodiment, the measurement report may consist of the reporting criteria as well as the measurement information that wireless device 110A has to report. For example, the following event-triggered criteria are specified for intra-RAT measurement reporting in LTE (see 3GPP TS 36.331 version 12.0.0, "Radio Resource Control"):

Event A1: Serving cell becomes better than absolute threshold.
Event A2: Serving cell becomes worse than absolute threshold.
Event A3: Neighbour cell becomes better than an offset relative to the serving cell.
Event A4: Neighbour cell becomes better than absolute threshold.
Event A5: Serving cell becomes worse than one absolute threshold and neighbor cell becomes better than another absolute threshold.

Similar intra RAT events may be observed in other radio access technologies such as UTRAN.

In other particular embodiments, equivalent inter RAT events for E-UTRAN and UTRAN may trigger measurement reports by wireless device 110A. As an example, the E-UTRAN inter RAT events may include:

Event B1 (Inter RAT neighbor becomes better than threshold)

Event B2 (PCell becomes worse than threshold1 and inter RAT neighbor becomes better than threshold2)

The UTRAN inter RAT events, as discussed in 3GPP TS 25.331 version 12.0.0, "UTRAN Radio Resource Control," may include:

Event 3a: The estimated quality of the currently used UTRAN frequency is below a certain threshold and the estimated quality of the other system is above a certain threshold.

Event 3b: The estimated quality of other system is below a certain threshold

Event 3c: The estimated quality of other system is above a certain threshold

At step 310, network node 115A determines whether to handover the connection to a target network node 115B. According to various embodiments, handover decision 310 is made based on the measurement reports the source network node 115A receives from wireless device 110A at a step 308.

If, at step 310, source network node 115A decides to perform a handover, source network node 115A sends a HANDOVER REQUEST message to the target network node 115B at step 312. Target network node 115B then performs admission control procedures at step 314 to decide whether to admit wireless device 110A and accept the handover. If target network node 115B is able to admit wireless device 110A, a request acknowledgement message is sent to wireless device 110A to initiate the handover at step 316 and the handover execution state 304 is entered.

As depicted in FIG. 3B, handover execution state 304 begins when downlink, DL, allocation data is transmitted to the wireless device 110A at step 318. At step 320, wireless device 110A detached from the old cell and synchronizes to the new cell. At step 322, DL data arrives at source network node 115A for wireless device 110A. The DL data is forwarded to target network node 115B at step 324 and received as buffered packets at step 326.

As shown in FIG. 3C, the handover completion stage 306 is entered once target network node 115B and wireless device 110A are synchronized and a handover confirm message is received by target network node 115B at step 328. After a proper setup of the connection with target network node 115B is performed, which may include the switching of the DL path in the serving gateway at step 330, the old connection is released at step 322. Any remaining data in source network node 115A that is destined for wireless device 110A is forwarded to target network node 115B. Then normal packet flow can ensue through target network node 115B.

Figure 4:
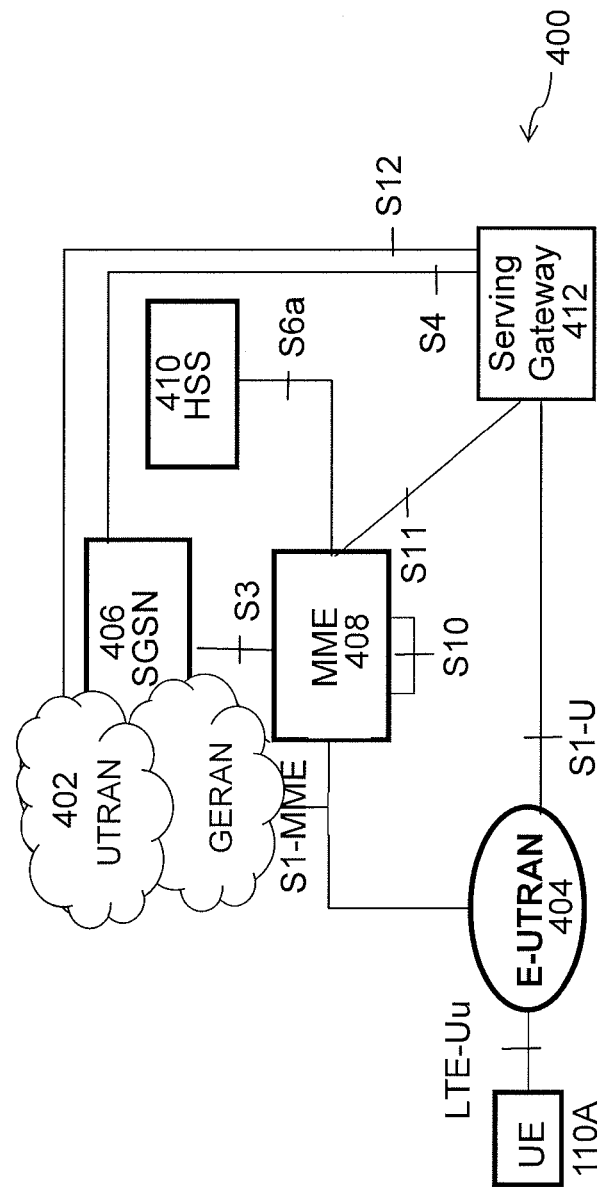
FIG. 4 is a block diagram illustrating an exemplary non-roaming architecture for 3GPP access, according to certain embodiments.

FIG. 4 is a block diagram illustrating an exemplary non-roaming architecture of network system 400 for 3GPP accesses, according to certain embodiments. Specifically, it depicts an example E-UTRAN/UTRAN architecture for inter RAT handover procedures. Certain of the procedures may be described in 3GPP TS 23.401 version 12.0.0, "E-UTRAN Access." In the depicted embodiment, the UTRAN base station equivalent (from the mobility procedures point of view) to an eNodeB is called radio network controller, RNC, 120. UTRAN base station or RNC 120 is connected with the serving GPRS support node 406, SGSN 406, via an interface called IU. Thus, RNC 120 and network nodes 115A-C form UTRAN 402. The RNC 120 and the network nodes 115A-C are not illustrated in FIG. 4, but in FIG. 1.

In the depicted example embodiment, the source network node is within the UTRAN 402, and the target network node is within the E-UTRAN 404. In the depicted embodiment, system 400 includes a source UTRAN/RNC which hands over communication from wireless device 110A to E-UTRAN 404, The operations and procedures performed by UTRAN 402, E-UTRAN 404, SGSN 406, MME 408, HSS 410, and serving gateway 412 of network system 400 are depicted in FIG. 5.

Figure 5:
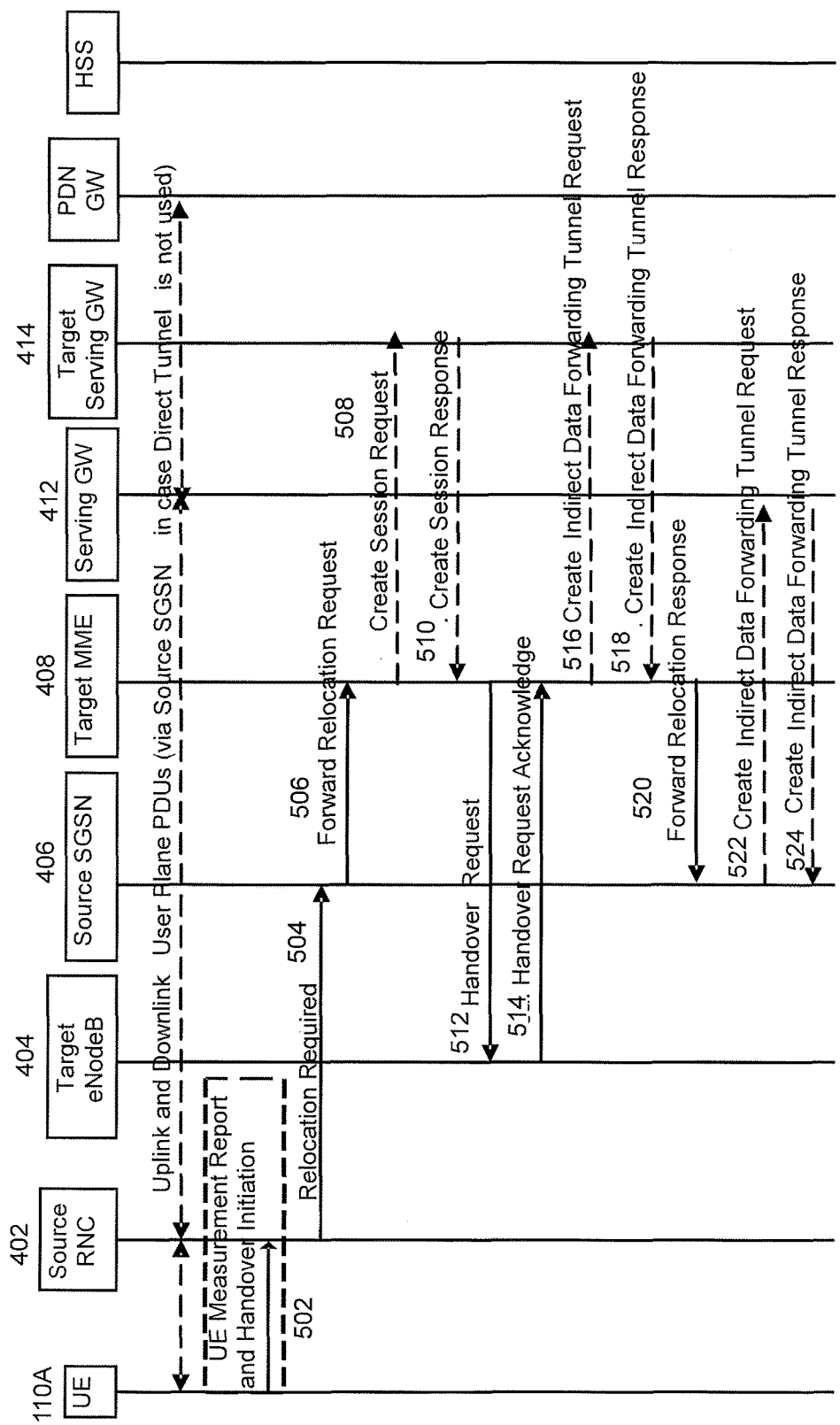
FIG. 5 is a signalling diagram illustrating an exemplary method for performing an inter radio access technology, Inter-RAT, handover to a E-UTRAN, according to certain embodiments.

Specifically, FIG. 5 is a flowchart illustrating an exemplary method for Inter-RAT handover from UTRAN 402 to E-UTRAN 404, according to certain embodiments. In the following, reference number 402 is sometimes used for the source network node, which in comprised in UTRAN 402, and reference number 404 is used for the target network node, which is comprised in the E-UTRAN 404. The source network node 115A may be an RNC and the target network node 115B may be an eNodeB. In the following, the source network node 402 is sometimes referred to as the source RNC 402, and the target network node is sometimes referred to as the target eNodeB 404.

The method begins at step 502, when the source RNC 402, receives a measurement report from wireless device 110A. In a particular embodiment, source RNC 402 decides to initiate an Inter-RAT handover to the E-UTRAN 404. At step 504, source RNC 402 sends a Relocation Required message to source SGSN 406 to request the Core Network, CN, to establish resources in the target eNodeB 404, Target MME 408, and the Serving GW 412. In particular embodiments, the Relocation Required message may include information such as a cause, a Target eNodeB Identifier, a Closed Subscriber Group, CSG, a CSG identity, CSGID, a CSG access mode, a Source RNC Identifier, and/or a Source RNC to Target RNC Transparent Container. The bearers that may be subject to data forwarding (if any) are identified by the target MME in a later step (see step 520 below).

Source SGSN 406 may determine from the 'Target eNodeB Identifier' IE that the type of handover is IRAT Handover to E-UTRAN. Source SGSN 406 may initiate the Handover resource allocation procedure by sending a Forward Relocation Request to Target MME 408 at step 506. In a particular embodiment, the Forward Relocation Request may include identifying information such as an International Mobile Subscriber Identity, IMSI; Target Identification; CSG ID; CSG Membership Indication; Mobility Management, MM, Context; Packet Data Network, PDN, Connections; SGSN Tunnel Endpoint Identifier for Control Plane; SGSN Address for Control plane; Source to Target Transparent Container; RAN Cause; Info Change Reporting Action; CSG Information Reporting Action; UE Time Zone; Idel state signaling reduction, ISR; Supported; Serving Network; Change to Report; or any combination of this or other suitable identifying information.

Target MME 408 may determine if the Serving GW is to be relocated. The Serving GW may be relocated, for example, due to PLMN change. At step 508, target MME 408 may send a Create Session Request to Target Serving Gateway 414. Target Serving Gateway 414 may then allocate its local resources and return the allocated local resources to Target MME 408 in a Create Session Response at step 510. The Create Session Response may include one or more Serving GW addresses for user plane; Serving GW Uplink Tunnel Endpoint Identifiers for user plane, Serving GW Address for control plane, Serving GW Tunnel Endpoint Identifiers for control plane, or other suitable information.

At step, 512, target MME 408 requests the target eNodeB 404 to establish the bearers by sending a message Handover Request to target eNodeB 404. In particular embodiments, the Handover Request may include a UE Identifier; S1 Application Protocol interface Cause value; encryption key, $K_{eNB}$, as defined in 3GPP TS 36.413; allowed AS Integrity Protection and Ciphering algorithm(s); NAS Security Parameters to E-UTRAN; Evolved Packet System, EPS, Bearers to be setup list, CSG ID, CSG Membership Indication, Source to Target Transparent Container, or any combination of this or other suitable information.

At step 514, target eNodeB 404 allocates the requested resources and returns the applicable parameters to the target MME 408 in a Handover Request Acknowledgement message. In particular embodiments, the Handover Request Acknowledgement message may include Target to Source Transparent Container, EPS Bearers setup list, EPS Bearers failed to setup list, or any combination of this or other suitable information.

If 'Indirect Forwarding' and relocation of Serving GW 416 apply, target MME 408 sends a Create Indirect Data Forwarding Tunnel Request message and sends it to target serving gateway 412 at step 516. The Create Indirect Data Forwarding Tunnel Request message may include Target eNodeB Address, TEID(s) for DL data forwarding, or other suitable information. Indirect forwarding may be performed via Serving GW 416. This is different from the Serving GW used as the anchor point for wireless device 110A.

At step 518, Serving GW 416 returns a Create Indirect Data Forwarding Tunnel Response to target MME 408. The Create Indirect Data Forwarding Tunnel Response may include Cause, one or more Serving GW Addresses and one or more Serving GW DL TEIDs for data forwarding, or other suitable information, in particular embodiments.

At step 520, target MME 408 sends a Forward Relocation Response message to source SGSN 406. The Forward Relocation Response message may include Cause, List of Set Up RABs, EPS Bearers setup list, MME Tunnel Endpoint Identifier for Control Plane, RAN Cause, MME Address for control plane, Target to Source Transparent Container, one or more Addresses and TEIDs for Data Forwarding, Serving GW change indication, and other suitable information. A Serving GW change indication may indicate whether a new Serving GW has been selected. A Target to Source Transparent Container includes the value from the Target to Source Transparent Container received from the target eNodeB 404.

If "Indirect Forwarding" applies, source SGSN 406 sends a Create Indirect Data Forwarding Tunnel Request message to serving gateway 412 at step 522. The Create Indirect Data Forwarding Tunnel Request message includes one or more Addresses and TEIDs for Data Forwarding that were received at step 520. Serving GW 412 uses the information for indirect forwarding, which is different from the Serving GW 412 used as the anchor point for wireless device 110A.

At step 524, Serving GW 412 returns the forwarding user plane parameters by sending a Create Indirect Data Forwarding Tunnel Response message. The Create Indirect Data Forwarding Tunnel Response message may include Cause, one or more Serving GW Addresses and TEIDs for data forwarding, and other suitable information for data forwarding. However, if Serving GW 412 doesn't support data forwarding, an appropriate cause value shall be returned and one or more Serving GW Addresses and TEIDs will not be included in the message.

As described above with regard to step 504, the source RNC 402 constructs the Relocation Required message by adding a Target eNB Identifier. Moreover, as shown in 3GPP TS 25.413 version 12.1.0, "Radio Access Network Application Part (RANAP) Signalling", the Relocation Required message also includes a Source eNB to Target eNB Transparent Container IE including the target cell E-CGI (enhanced Cell Global Identifier). However, the Target eNB Identifier, E-CGI, and other parameters concerning the target cell/node that are different from the target cell PCI may not be deductible from the UE measurement report. According to 3GPP TS 25.331 version 12.1.0, "UTRAN Radio Resource Control," the UE measurement report shall report target cell PCI. However, the UE measurement report is not required to report other target cell identification parameters useful to construct the Relocation Required message.

Figure 6:
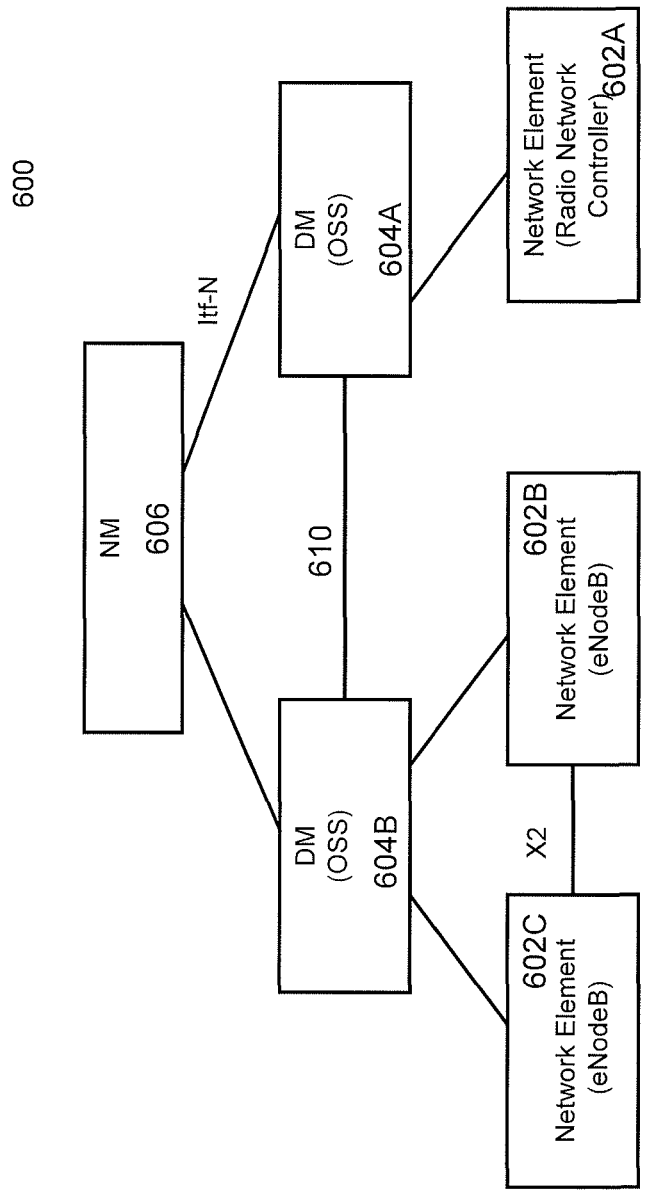
FIG. 6 is a block diagram illustrating an exemplary assumed management system, according to certain embodiments.

FIG. 6 is a block diagram illustrating an exemplary assumed management system 600, according to certain embodiments. As depicted, the management system 600 includes three node elements, NE, 602A-C, also referred to as eNodeB 602A-C. Each NE 602A-C is managed by a domain manager, DM, 604A-B. DM 604A-B may also be referred to as the operation and support system, OSS. DM 604A-B may further be managed by a network manager, NM, 606. Two NEs 602 are interfaced by X2 608. DMs 604 may interface in certain embodiments. Where they do interface with each other, the interface may be referred to as Itf-P2P 610. In a particular embodiment, any function described above that automatically optimizes NE parameters can in principle execute in the NE, DM, or the NMS. For example, in certain embodiments, source RNC 602C may receive UE measurement reports and determine that a handover is appropriate. When target NE 602A receives the handover request, target NE 602A may determine that the PCI identified in the request refers to an inactive cell. Based on a mapping between the inactive cell and the active cell that also uses the PCI of the inactive cell, target NE 602A or 602B may determine certain cell parameters to be applied to the active cell and complete the handover procedure.

Figure 7:
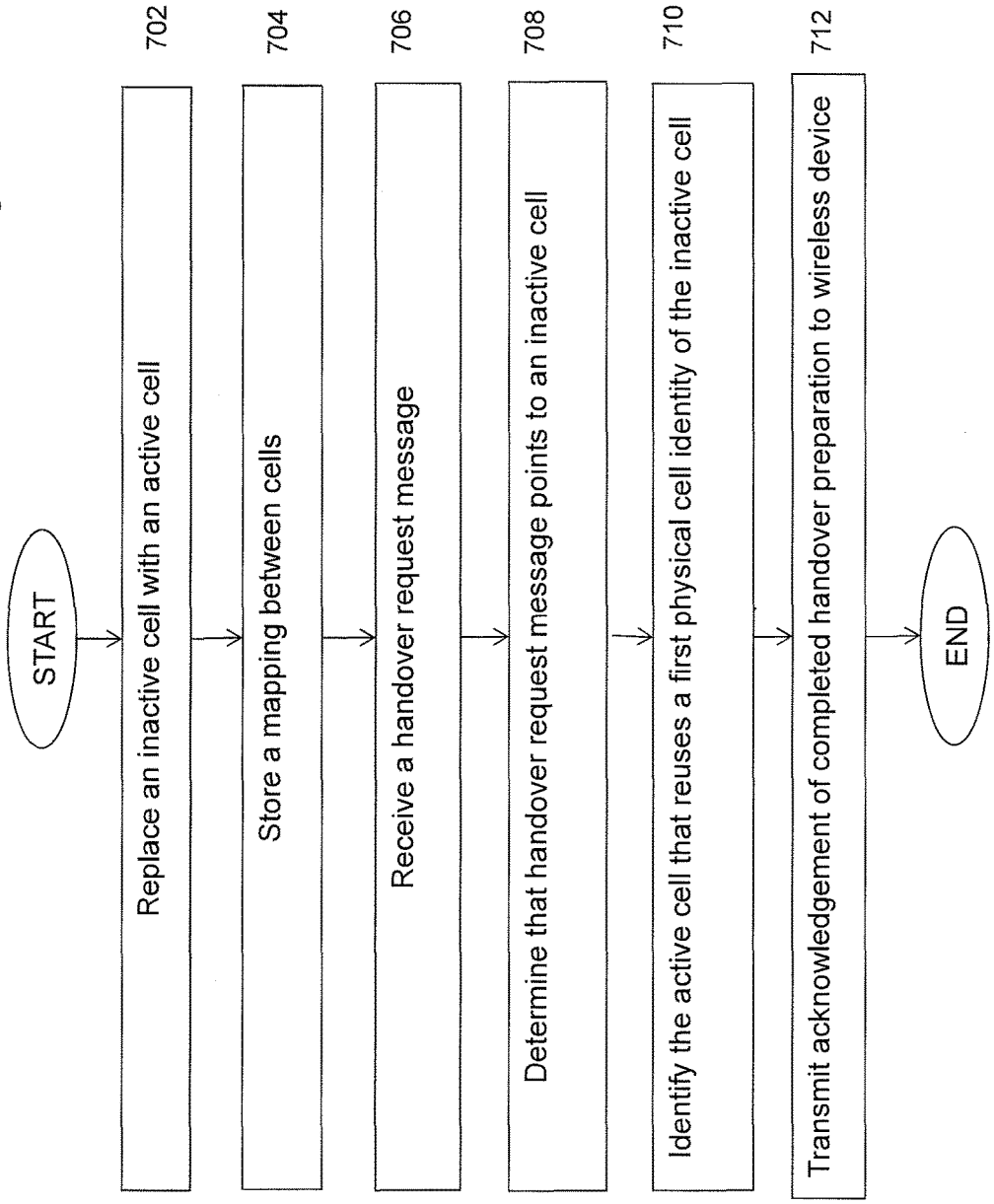
FIG. 7 is a flowchart illustrating an exemplary method for performing a handover during cell reconfiguration periods, according to certain embodiments.

FIG. 7 is a flowchart illustrating an embodiment of a method for performing a handover during cell reconfiguration periods. Specifically, the depicted embodiment illustrates a method for replacing an inactive cell with an active cell in response to a handover request message following one or more cell reconfigurations. The method may ensure that under certain cell configuration change conditions, the target network node 115B is able to correctly carry on handover procedures when handover preparation messages for a cell that has been re-configured are received. Specifically, the target network node 115B may perform a handover directed toward a cell that previously existed but that might have been replaced by one or more cells, without the handover failing. For the sake of simplicity, the example where the target system is E-UTRAN 404 and the source system is UTRAN 402, as described above with regard to FIGS. 4 and 5, may be considered. However, the described techniques may be applied to any source and target radio access technology where cell reconfigurations are possible.

The method begins at step 702 when an inactive cell is replaced with an active cell. Specifically, a cell associated target eNodeB 404 may reuse a first PCI formerly used by an inactive cell. The reused first PCI may be included in the UE measurement report received by target eNodeB 404. For example, if a measurement report from a wireless device 110A, reports a reused PCI and if the RELOCATION REQUIRED message is constructed including cell information for the old cell, target eNodeB 404 may understand that the old cell parameters included in the RELOCATION REQUIRED message correspond to a cell that has been replaced by another cell reusing the same PCI. In a particular embodiment, for example, the reused PCI may include a PCI for E-UTRAN. In another embodiment, the reused PCI may include a physical scrambling code, PSC, for UTRAN.

At step 704, a mapping between the inactive cell and the active cell that is replacing the inactive cell is stored by target eNodeB 404. Specifically, target eNodeB 404 may store one or more target cell parameters for the active cell as being associated with the first physical identity. For example, target eNodeB 404 may replace one or more previous cell parameters associated with the inactive cell with the one or more target cell parameters associated with the active cell. In particular embodiments, the one or more target cell parameters may include an E-CGI, TAI, eNodeB ID, PLMN ID, or any one of these or combination of these or other cell parameters.

In a particular embodiment, target eNodeB 404 may transmit information that includes the one or more target cell parameters for the active cell to source RNC 402. Such information may include, in particular embodiments, a capacity of a configuration of a target network eNodeB 404, a CGI to PCI relation for at least one cell served by target eNodeB 404, a CGI to PCI relation for at least one cell served by the target eNodeB 404 and a configuration parameter indicating a setting associated with the active cell, at least one indicator identifying at least one configuration in target eNodeB 404 that is no longer used, and at least one indicator identifying at least one configuration in target eNodeB 404 that has been activated, or any one or combination of these or other identifying information.

At step 706, a handover request message is received by target eNodeB 404. Target eNodeB 404 may determine that the handover request message points to an inactive cell at step 708. Specifically, the handover request message may include a first PCI that is associated with an inactive cell.

At step 710, target eNodeB 404 may identify the active cell that reuses the first PCI of the inactive cell. The identification of the active cell may be based on the mapping stored by target eNodeB 404. Target eNodeB 404 may then replace one or more of the cell parameters associated with the inactive cell with one or more target cell parameters associated with the active cell. In a particular embodiment, the inactive cell may cover at least a portion of a cell coverage area associated with the inactive cell. Additionally, target eNodeB 404 may be a serving node for the inactive cell and the active cell.

At step 712, target eNodeB 404 transmits an acknowledgement of completed handover preparation to wireless device 110A. Therefore, target eNodeB 404 prepares the new cell reusing the old cell's PCI for the purpose of handover preparation. For example, a condition to allow routing of handover messages to the correct target eNodeB is that reuse of PCIs for old and new cells is done within the same target eNodeB 404 and not across different network nodes. Conversely, where such reuse if done across different network nodes, the source network node 402, e.g. RNC, may include, in a RELOCATION REQUIRED message, an eNodeB ID pointing at an eNodeB not serving (neither currently nor previously) a cell with cell parameters included in the RELOCATION REQUIRED message. In the latter case, mapping of target cell parameters with newly created cells may not be possible.

As described above, target eNodeB 404 may become aware that the source RAT is not updated with the latest configuration information. This could act as a trigger to provide this new network information to the source RAT. This can be done by:

Communication via the domain managers or network managers

Communication using existing interfaces. RIM could be used for E-UTRAN-GERAN or E-UTRAN-UTRAN communication Communication using new interfaces between E-UTRAN and other radio access technologies.

Piggybacking the information in the handover response message.

When the new Cell Global Identity to physical cell identity relation/relations, e.g. ECGI-PCI relation/relations, are transferred, source network node 402 knows that the target eNodeB 404 configuration has changed and can select the correct target cell identifier (e.g. E-CGI). Further, if the configuration indicator is provided from the target eNodeB 404, to the other radio access technology it can store parameters. One example is mobility parameters, per configuration. For one particular configuration, a PCI would enable the source radio access technology to select the optimized set.

For optimizing the network with respect to energy savings, a capacity indicator of the configuration could also be sent to the source radio access technology. As an example the low capacity state could be when the eNodeB has optimized the usage of the power amplifiers in such way that only one big cell provides the footprint instead of several smaller cells. When this cell is split into several cells the capacity increases. The power consumption also increases because additional hardware may be needed.

The source radio access technology could use the capacity indicator to indicate the (relative) capacity of the current state in the target eNodeB 404. If the source radio access technology has the knowledge that the target eNodeB 404 is in its most energy efficient mode it could be advantageous to enable other capacity mechanisms before moving wireless devices 110A to the target eNodeB 404, which would need to switch to a more energy consuming state.

Figure 8:
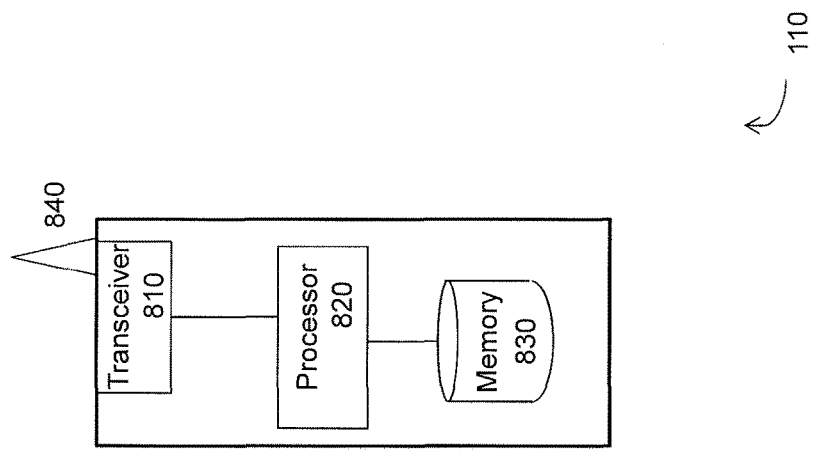
FIG. 8 is block diagram illustrating an exemplary wireless device, according to certain embodiments.

FIG. 8 is a block diagram illustrating an example wireless device 110, according to certain embodiments. Examples of wireless device 110 include a mobile phone; a smart phone; a PDA, Personal Digital Assistant; a portable computer (e.g., laptop, tablet); a sensor; a modem; a machine type, MTC, device/machine to machine, M2M, device; laptop embedded equipment, LEE; laptop mounted equipment, LME; USB dongles; a device-to-device capable device; or another device that can provide wireless communication. A wireless device 110 may also be referred to as user equipment, UE; a station, STA; a device; or a terminal in some embodiments. Wireless device 110 includes transceiver 810, processor 820, and memory 830. In some embodiments, transceiver 810 facilitates transmitting wireless signals to and receiving wireless signals from radio network node 120 (e.g., via an antenna), processor 820 executes instructions to provide some or all of the functionality described above as being provided by wireless device 110, and memory 830 stores the instructions executed by processor 820.

Processor 820 may include any suitable combination of hardware and software implemented in one or more modules to execute instructions and manipulate data to perform some or all of the described functions of wireless device 110. In some embodiments, processor 820 may include, for example, one or more computers, one or more central processing units, CPUs, one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory, RAM, or Read Only Memory, ROM), mass storage media (for example, a hard disk), removable storage media (for example, a Compact Disk, CD, or a Digital Video Disk, DVD), and/or or any other volatile or non-volatile, non-transitory computer-readable and/or computer-executable memory devices that store information.

Other embodiments of wireless device 110A-C may include additional components beyond those shown in FIG. 8 that may be responsible for providing certain aspects of the wireless device's functionality, including any of the functionality described above and/or any additional functionality (including any functionality necessary to support the solution described above).

Figure 9:
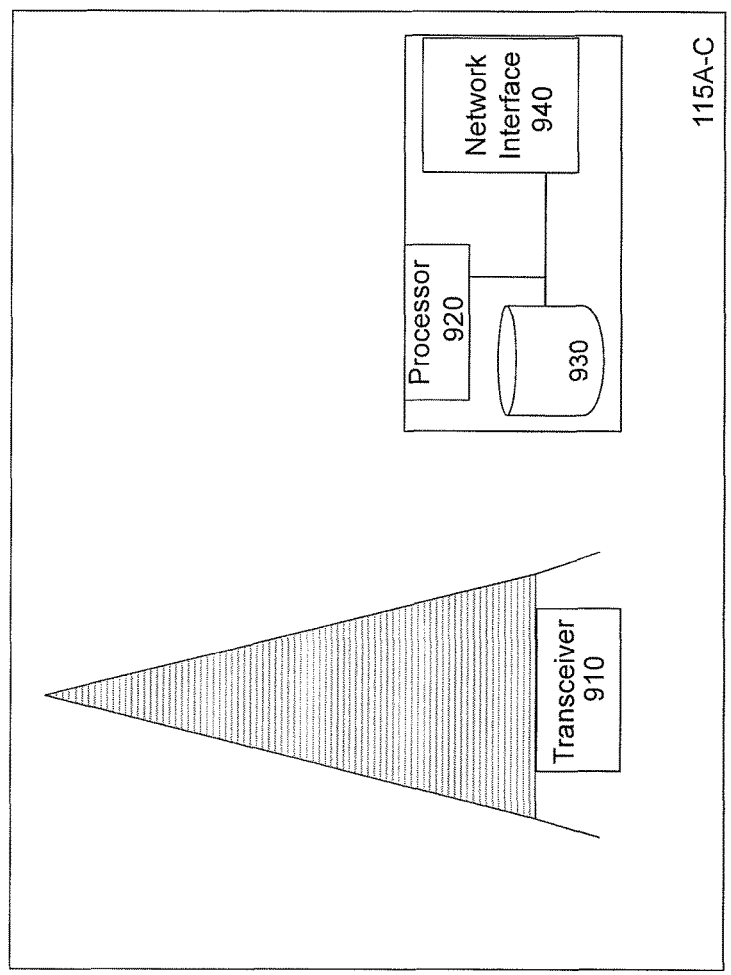
FIG. 9 is a block diagram illustrating an exemplary network node, according to certain embodiments.

FIG. 9 is a block diagram illustrating an exemplary radio network node 115A-C, according to certain embodiments. Examples of radio network node 115A-C include an eNodeB, a node B, a base station, a wireless access point (e.g., a Wi-Fi access point), a low power node; a base transceiver station, BTS; transmission points; transmission nodes; remote RF unit, RRU; remote radio head, RRH; etc. Radio network nodes 115A-C may be deployed throughout network 100 as a homogenous deployment, heterogeneous deployment, or mixed deployment. A homogeneous deployment may generally describe a deployment made up of the same (or similar) type of radio network nodes 115A-C and/or similar coverage and cell sizes and inter-site distances. A heterogeneous deployment may generally describe deployments using a variety of types of radio network nodes 115A-C having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115A-C may include one or more of transceiver 910, processor 920, memory 930, and network interface 940. In some embodiments, transceiver 910 facilitates transmitting wireless signals to and receiving wireless signals from wireless device 910 (e.g., via an antenna), processor 920 executes instructions to provide some or all of the functionality described above as being provided by a radio network node 115A-C, memory 930 stores the instructions executed by processor 920, and network interface 940 communicates signals to backend network components, such as a gateway, switch, router, Internet, Public Switched Telephone Network, PSTN, core network nodes 130, radio network controllers 120, etc.

Processor 920 may include any suitable combination of hardware and software implemented in one or more modules to execute instructions and manipulate data to perform some or all of the described functions of radio network node 115A-C. In some embodiments, processor 520 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory, RAM, or Read Only Memory, ROM), mass storage media (for example, a hard disk), removable storage media (for example, a Compact Disk, CD, or a Digital Video Disk, DVD), and/or or any other volatile or non-volatile, non-transitory computer-readable and/or computer-executable memory devices that store information.

In some embodiments, network interface 940 is communicatively coupled to processor 920 and may refer to any suitable device operable to receive input for radio network node 115A-C, send output from radio network node 115A-C, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

In a particular embodiment, transceiver 910 may include an adaptive antenna system, AAS, and processor 920 may include circuitry via the AAS. For example, processor 920 may be arranged to control AAS to change a cell configuration, either based on control commands from another network node obtained from the communication circuitry.

According to one embodiment, the processing unit has controlled the adaptive antenna system to change a cell configuration at one time instant, received via the communication circuitry a handover request message from a neighbour network node 115A-C, determined that the handover request is for a cell that has been deactivated and replaced with one or more cells and that one of these new cells reuses the physical cell identity of the de-activated cell. In another embodiment, the processing unit may decide to accept the handover request for the de-activated target cell without triggering handover failure procedures. In this case, the processing unit may decide to prepare for handover of one or more of the newly activated cells replacing the deactivated cell. One of the prepared cells may be the cell reusing the physical cell identity of the de-activated cell.

Other embodiments of radio network node 115A-C may include additional components beyond those shown in FIG. 9 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 10:
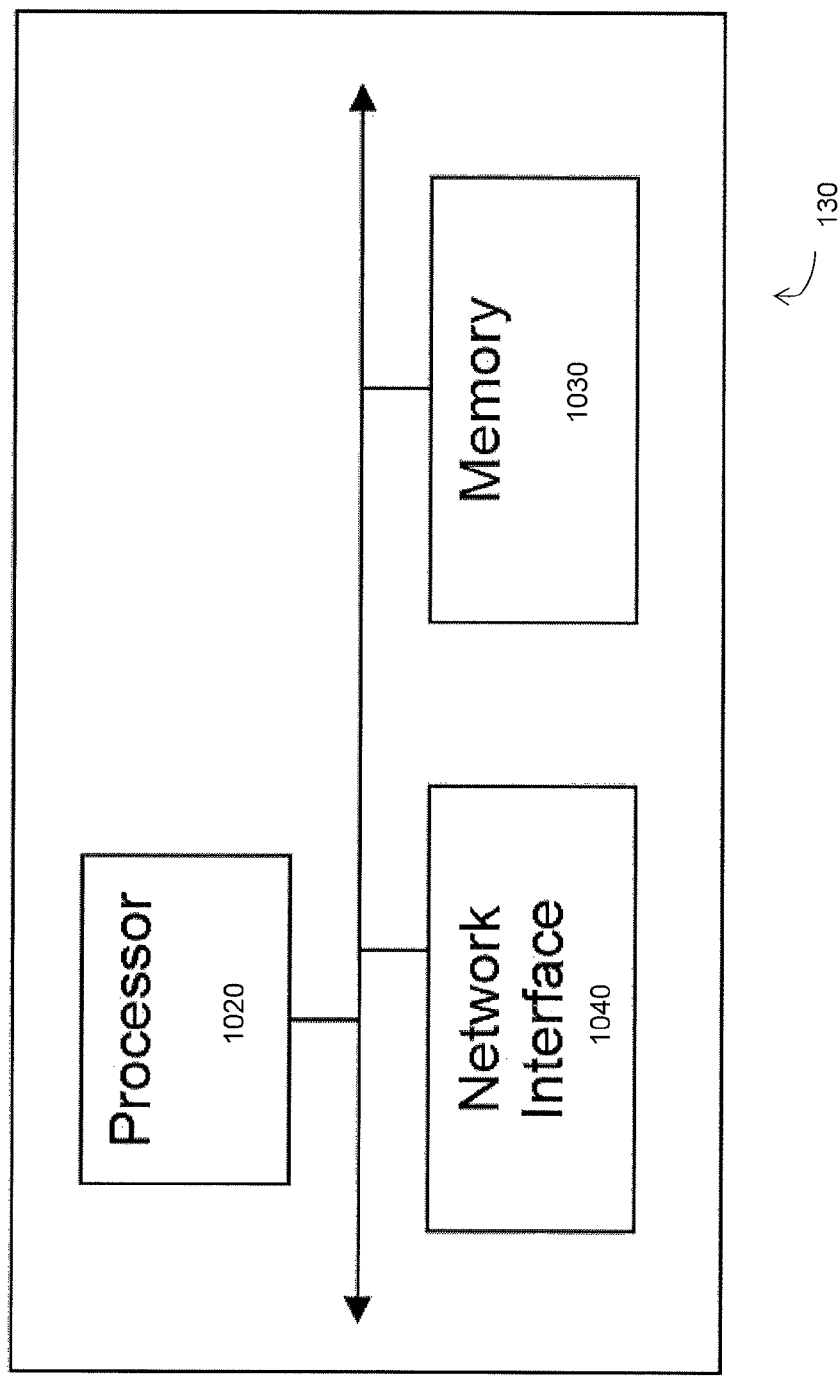
FIG. 10 is a block diagram illustrating an exemplary core network node, according to certain embodiments.

FIG. 10 is a block diagram illustrating an exemplary radio network controller 120 or core network node 130, according to certain embodiments. Examples of network nodes can include a mobile switching center, MSC; a serving GPRS support node, SGSN; a mobility management entity, MME; a radio network controller, RNC; a base station controller, BSC; and so on. The network node includes processor 1020, memory 1030, and network interface 1040. In some embodiments, processor 1020 executes instructions to provide some or all of the functionality described above as being provided by the network node, memory 1030 stores the instructions executed by processor 1020, and network interface 1040 communicates signals to a suitable node, such as a gateway, switch, router, Internet, Public Switched Telephone Network, PSTN, radio network nodes 115, radio network controllers 120, core network nodes 130, etc.

Processor 1020 may include any suitable combination of hardware and software implemented in one or more modules to execute instructions and manipulate data to perform some or all of the described functions of the network node. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory, RAM, or Read Only Memory, ROM), mass storage media (for example, a hard disk), removable storage media (for example, a Compact Disk, CD, or a Digital Video Disk, DVD), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Thus, in particular example implementations, the proposed solutions may provide methods for identifying a handover target cell during cell configuration periods. In one example embodiment, a method performed by a target network node is provided for replacing an inactive cell with an active cell in response to a handover request message following one or more reconfigurations. An inactive cell may be replaced with an active cell that reuses a first physical cell identity associated with the inactive cell. A mapping between the inactive cell and the active cell that is replacing the inactive cell may be stored. A handover request message may be received from a source network node. The handover request message may identify the first physical cell identity and one or more cell identifiers that points to the inactive cell. It may be determined that the first physical cell identity and the one or more cell identifiers identified in the handover request message point to the inactive cell. Based on the mapping between the inactive cell and the active cell, the active cell may be identified as reusing the first physical identity. In response to a request from a wireless device for handover execution to the inactive cell, a message to the wireless device may be transmitted to acknowledge completed handover preparation toward the active cell.

In another example embodiment, a target network node for replacing an inactive cell with an active cell in response to a handover request message following one or more cell reconfigurations includes a memory storing instructions and one or more processors in communication with the memory. The one or more processors may operate to execute the instructions to cause the one or more processors to replace an inactive cell with an active cell that reuses a first physical cell identity associated with the inactive cell. A mapping between the inactive cell and the active cell that is replacing the inactive cell may be stored. A handover request message from a source network node may be received. The handover request message may identify the first physical cell identity and one or more cell identifiers associated with the inactive cell. It may be determined that the first physical cell identity and the one or more cell identifiers identified in the handover request message point to the inactive cell. Based on the mapping between the inactive cell and the active cell, the active cell that reuses the first physical cell identity may be identified. In response to a request from a wireless device for handover execution to the inactive cell, a message may be transmitted to the wireless device that acknowledges completed handover preparation toward the active cell.

In another particular example embodiment, a method may include receiving a handover request message from a source base station at a target base station. The target cell parameters included in the handover request message may point at a cell that is not active anymore and that may have been replaced by one or more cells. The inactive cell may be replaced with a new cell that reuses the same physical cell identity (e.g., PCI for LTE target cells). A mapping may be maintained between inactive cell and active cells replacing it. Records of the new cell that reuses the same physical cell identity as the inactive cell may be maintained. Optionally, the mapping between inactive cell and new cells replacing it may be used to determine that the handover request received for the inactive cell should result in preparation of the new active cell reusing the same physical cell identity as the inactive cell. Optionally, one condition to unambiguously route the handover preparation messages from source base station to target base station may be that the inactive and new active cells reusing the physical cell identity are served by the same base station. Optionally, the node identifier associated with the inactive cell and used for handover message routing within the network may point at the same node serving the new active cell. Optionally, the target base station may receive a handover request message including target cell parameters associated to an inactive target cell. Rather than generate a handover failure, a handover request acknowledgement may be issued, as if handover to the inactive target was prepared successfully.

In another example embodiment, a method may include responding, by the target base station, to a handover request towards a target cell that has been deactivated or placed as inactive due to a change of cell configuration with a notification. The notification may include of some or all of the following: cell configuration change indication, configuration capacity indication, Global Cell Identity to Physical Cell Identity mapping.

In another example embodiment, the method may include maintaining, by the OAM system, a mapping of the deactivated cells and newly activated cells in a given base station. The OAM system may configure the base station with mapping rules between possibly inactive handover target cells signaled as target via handover request messages and active cells that should be prepared for handovers. Optionally, the OAM system may provide information on current configuration capacity, Global Cell Identity to Physical Cell Identity mapping Other implementations may include a wireless communication device and/or access node configured to implement the described method, or a wireless communication system in which a wireless communication device and/or access node implement the described method.

Some embodiments of the disclosure may provide one or more technical advantages. For example, in certain embodiments, means for handover towards a cell that is not active may be provided. The handover success may be due to the capability of the network (i.e., target base station, OAM system or any other equivalent entity) to maintain a mapping of old cell configuration and current cell configuration and to be able to prepare for handover cells that are active and that replace in part or in full the inactive cell towards which the handover is triggered. Another technical advantage may be that legacy source radio access systems may not be subject to any changes due to the introduction of dynamic cell configuration changes at target radio access systems.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A target network node for replacing an inactive cell with an active cell in response to a handover request message following one or more cell reconfigurations, the target network node comprising:
    a memory storing instructions; and
    one or more processors in communication with the memory, the one or more processors configured to execute the instructions to cause the one or more processors to:
        replace the inactive cell with the active cell that reuses a first physical cell identity associated with the inactive cell; and
        store a mapping between the inactive cell and the active cell that is replacing the inactive cell;
        receive a handover request message from a source network node, the handover request message identifying the first physical cell identity and one or more cell identifiers associated with the inactive cell;
        determine that the first physical cell identity and the one or more cell identifiers identified in the handover request message point to the inactive cell;
        based on the mapping between the inactive cell and the active cell, identify the active cell that reuses the first physical cell identity; and
        in response to a request from a wireless device for handover execution to the inactive cell, transmit a message to the wireless device that acknowledges completed handover preparation toward the active cell.

2. The target network node of claim 1, wherein the one or more cell identifiers are selected from the group consisting of:
    an Enhanced Cell Global Identity, E-CGI, for Evolved Universal Mobile Telecommunications System Terrestrial Radio Access, E-UTRAN; and
    a Cell Global Identity, CGI, for Universal Mobile Telecommunications System Terrestrial Radio Access, UTRAN.

3. The target The network node of claim 1, wherein the first physical cell identity is selected from the group consisting of:
    a physical cell identifier, PCI, for Evolved Universal Mobile Telecommunications System Terrestrial Radio Access, E-UTRAN; and
    a physical scrambling codes, PSC, for Universal Mobile Telecommunications System Terrestrial Radio Access, UTRAN.

4. The target network node of claim 1, wherein the one or more processors are further configured to store one or more target cell parameters for the active cell as being associated with the first physical cell identity.

5. The target network node of claim 4, wherein the one or more processors are further configured to transmit information to the source network node, the information comprising the one or more target cell parameters for the active cell associated with the first physical cell identity.

6. The target network node of claim 5, wherein the information further comprises information selected from the group consisting of:
    a capacity of a configuration of the target network node;
    a cell global identity, CGI, to physical cell identity relation for at least one cell served by the target network node;
    a CGI to physical cell identity relation for at least one cell served by the target network node and a configuration parameter indicating a setting associated with the active cell;
    at least one indicator identifying at least one configuration in the target network node that is no longer used; and
    at least one indicator identifying at least one configuration in the target network node that has been activated.

7. The target network node of claim 4, wherein the one or more processors are further configured to replace one or more previous cell parameters associated with the inactive cell with the one or more target cell parameters associated with the active cell.

8. The target network node of claim 4, wherein the one or more target cell parameters are selected from the group consisting of:
    an evolved cell global identity, E-CGI;
    a Tracking Area Identity, TAI;
    evolved nodeB identifier, eNodeB ID; and
    public land mobile network identifier, PLMN ID.

9. The target network node of claim 1, wherein the active cell covers at least a portion of a cell coverage area associated with the inactive cell.

10. The target network node of claim 1, wherein the target network node comprises a serving node for the inactive cell and the active cell.

11. The target network node of claim 1, wherein the one or more processors are further configured to access mapping rules that associate one or more inactive cells with one or more active cells.

12. A method performed by a target network node for replacing an inactive cell with an active cell in response to a handover request message following one or more reconfigurations, the method comprising:

replacing the inactive cell with the active cell that reuses a first physical cell identity associated with the inactive cell; and storing a mapping between the inactive cell and the active cell that is replacing the inactive cell;

receiving a handover request message from a source network node, the handover request message identifying the first physical cell identity and one or more cell identifiers that points to the inactive cell;

determining that the first physical cell identity and the one or more cell identifiers identified in the handover request message point to the inactive cell;

based on the mapping between the inactive cell and the active cell, identifying that the active cell reuses the first physical identity; and in response to a request from a wireless device for handover execution to the inactive cell, transmitting a message to the wireless device that acknowledges completed handover preparation toward the active cell.

13. The method of claim 12, wherein the one or more cell identifiers are selected from the group consisting of:
   an Enhanced Cell Global Identity, E-CGI, for Evolved Universal Mobile Telecommunications System Terrestrial Radio Access, E-UTRAN; and
   a Cell Global Identity, CGI, for Universal Mobile Telecommunications System Terrestrial Radio Access, UTRAN.

14. The method of claim 12, wherein the first physical cell identity is selected from the group consisting of:
   a physical cell identifier, PCI, for Evolved Universal Mobile Telecommunications System Terrestrial Radio Access, E-UTRAN; and
   a physical scrambling codes, PSC, for Universal Mobile Telecommunications System Terrestrial Radio Access, UTRAN.

15. The method of claim 12, further comprising storing one or more target cell parameters for the active cell as being associated with the first physical cell identity.

16. The method of claim 15, further comprising transmitting information to the source network node, the information comprising the one or more target cell parameters for the active cell associated with the first physical cell identity.

17. The method of claim 16, wherein the information further comprises information selected from the group consisting of:
   a capacity of a configuration of the target network node;
   a cell global identity, CGI, to physical cell identity relation for at least one cell served by the target network node;
   a CGI to physical cell identity relation for at least one cell served by the target network node and a configuration parameter indicating a setting associated with the active cell;
   at least one indicator identifying at least one configuration in the target network node that is no longer used; and
   at least one indicator identifying at least one configuration in the target network node that has been activated.

18. The method of claim 15, further comprising replacing one or more previous cell parameters associated with the inactive cell with the one or more target cell parameters associated with the active cell.

19. The method of claim 15, wherein the one or more target cell parameters are selected from the group consisting of:
   an evolved cell global identity, E-CGI;
   a Tracking Area Identity, TAI;
   evolved nodeB identifier, eNodeB ID; and
   public land mobile network identifier, PLMN ID.

20. The method of any one of claim 12, wherein the active cell covers at least a portion of a cell coverage area associated with the inactive cell.

21. The method of claim 12, wherein the target network node comprises a serving node for the inactive cell and the active cell.

22. The method of claim 12, further comprising accessing mapping rules that associate one or more inactive cells with one or more active cells.

\* \* \* \* \*